US007080775B2

(12) United States Patent
Gorelick

(10) Patent No.: US 7,080,775 B2
(45) Date of Patent: Jul. 25, 2006

(54) METHODS AND SYSTEMS FOR AUTOMATICALLY DETERMINING AND COLLECTING A MONETARY CONTRIBUTION FROM AN INSTRUMENT

(75) Inventor: Steven M. Gorelick, Portola Valley, CA (US)

(73) Assignee: American Cancer Society, Atlanta, GA (US)

( * ) Notice: Subject to any disclaimer, the term of this patent is extended or adjusted under 35 U.S.C. 154(b) by 100 days.

(21) Appl. No.: 10/656,748

(22) Filed: Sep. 5, 2003

(65) Prior Publication Data
US 2005/0051617 A1    Mar. 10, 2005

(51) Int. Cl.
G06Q 40/00    (2006.01)
G07D 11/00    (2006.01)
G07F 19/00    (2006.01)

(52) U.S. Cl. ...................... 235/379; 235/375
(58) Field of Classification Search ............ 235/375, 235/379, 380; 705/1, 14, 37, 34, 39, 17, 705/35
See application file for complete search history.

(56) References Cited

U.S. PATENT DOCUMENTS

| | | | |
|---|---|---|---|
| 5,302,811 A | 4/1994 | Fukatsu | |
| 5,404,985 A | 4/1995 | Baughman | |
| 5,466,919 A | 11/1995 | Hovakimian | |
| 5,506,393 A | 4/1996 | Ziarno | |
| 5,546,303 A | 8/1996 | Helbling | |
| 5,555,497 A | 9/1996 | Helbling | |
| 5,621,640 A | 4/1997 | Burke | |
| 5,724,518 A | 3/1998 | Helbling | |
| 5,794,207 A | 8/1998 | Walker et al. | |
| 5,806,045 A | 9/1998 | Biorge et al. | |
| 5,960,411 A | 9/1999 | Hartman et al. | |
| 6,088,682 A | 7/2000 | Burke | |
| 6,112,191 A | 8/2000 | Burke | |
| 6,115,680 A | 9/2000 | Coffee et al. | |
| 6,253,998 B1 | 7/2001 | Ziarno | |
| 2002/0062173 A1* | 5/2002 | Gzybowski | 700/232 |
| 2002/0120513 A1* | 8/2002 | Webb et al. | 705/14 |
| 2002/0174083 A1 | 11/2002 | Major | |

(Continued)

FOREIGN PATENT DOCUMENTS

WO    WO 99/11006 A2    3/1999

(Continued)

OTHER PUBLICATIONS

International Search Report, PCT US0/04/282249, dated May 20, 2005.

Primary Examiner—Michael G. Lee
Assistant Examiner—Lisa M. Caputo
(74) Attorney, Agent, or Firm—Kilpatrick Stockton LLP

(57) ABSTRACT

Methods and systems are provided for automatically determining and collecting a monetary contribution from an instrument associated with a donor. An embodiment of a method according to the invention includes receiving an instrument, determining a currency amount of the instrument, and determining a monetary contribution. If the instrument is a financial instrument, the method rounds the currency amount of the financial instrument downward to a lower currency amount; and determines the difference (a positive value) between the amount of the financial instrument and the lower currency amount for the monetary contribution. If the instrument is a billing instrument, the method rounds the currency amount of the billing instrument upward to a higher currency amount; and determines the difference (a positive value) between the higher currency amount and the amount of the billing instrument for the monetary contribution. The method also collects the monetary contribution into the target account.

48 Claims, 5 Drawing Sheets

U.S. PATENT DOCUMENTS

2003/0028483 A1   2/2003  Sanders et al.
2003/0065572 A1   4/2003  McNee et al.
2003/0093293 A1*  5/2003  Han ............................. 705/1

FOREIGN PATENT DOCUMENTS

WO      WO 03/034186 A2    4/2003

* cited by examiner

METHODS AND SYSTEMS FOR AUTOMATICALLY DETERMINING AND COLLECTING A MONETARY CONTRIBUTION FROM AN INSTRUMENT

FIELD OF THE INVENTION

The invention generally relates to processing financial transactions. More particularly, the invention relates to methods and systems for automatically determining and collecting a monetary contribution from an instrument (such as a paycheck or a bill).

BACKGROUND OF THE INVENTION

Conventional systems and methods for collecting monetary contributions from a donor include the distribution of one or more collection containers. In many instances, the collection containers are manually placed in shops, businesses, and other public places to solicit monetary donations from the public. When a person wants to make a donation, the donation is placed into the collection container. After time or when the collection container is full, each of the collection containers is sent to a central location for counting and administration of the monetary contributions. Since these types of contributions are anonymous, in most instances there is no donor accounting, acknowledgment, or reporting.

For example, at least one charity solicits donations in convenience stores using a collection jar with the name of the charity on the exterior of the collection jar. Customers of the convenience store are encouraged to donate monies such as spare change from a financial transaction with a cashier by placing the monies into the container. Thus, a customer/donor paying for a $1.75 item in a store could provide $2.00 to a store clerk. The store clerk would determine that $0.25 change is to be given back to the customer/donor. The customer/donor could put a portion or all of the change into the collection container. When the collection jar is full, the charity picks up the collection jar and transports the jar to a central location for counting. All donated monies from collection jars are counted and deposited into an account on behalf of the charity. This and other similar conventional systems and methods have many drawbacks.

Administration of collection jars is time consuming, inefficient, and expensive. Monies collected in each collection jar must be counted and then collected in a centralized location for deposit to a charity or to another fundraising entity. Further, collection jars are prone to theft as unscrupulous individuals can easily remove monies from the jar or can otherwise remove jars from their locations in public places. Moreover, individuals making donations to a collection jar cannot or rarely account for their donations, and therefore cannot obtain a tax deduction for their charitable contribution provided by certain tax laws and regulations. In other instances, individuals cannot obtain recognition from their employer for their charitable contributions or obtain matching contributions from their employer since donations to a collection jar are difficult to track and to account for on an individual basis. These and other drawbacks discourage many individuals from making charitable contributions to collection jars or by other methods, while other individuals might be discouraged from increasing their charitable contributions for many of the same or other reasons. Similarly, some charitable organizations might find these and other drawbacks exceed the benefits of manually collecting monetary contributions.

Monetary contributions via an electronic transaction became possible when banks and other financial institutions accepted electronic transfers of monetary funds for the purchase of goods and services. Computerized financial networks also enhanced the ability of conventional systems and methods to collect monetary contributions from donors at a point-of-sale transaction, such as when a customer purchases an item at a cash register. These conventional systems and methods also provide methods for determining a monetary contribution from a point-of-sale transaction. However, these conventional systems and methods are limited to determining and collecting monetary contributions from donors during a point-of-sale transaction. These conventional systems and methods include at least the following references:

U.S. Pat. No. 6,253,998 B1 to Ziarno ("the '998 Patent"): This patent discloses a point-of-sale, fundraising terminal for managing charitable contributions. However, the '998 Patent concerns monetary contributions made at a point-of-sale such as when purchasing an item in a store. Using the fundraising terminal disclosed in the '998 Patent, a customer/donor can make a cash contribution, a credit card contribution, or a debit card contribution to a third-party. The customer/donor must offer the contribution at the time of the point-of-sale transaction, and then manually inputs the amount for the desired contribution into the fundraising terminal, in this case, a portable, hand-held contribution collection device located at the location of the point-of-sale. Additional information such as customer and account identification can be collected by the fundraising terminal, and the contribution amount can then be transmitted vis a communication link to a funds processing database or to a debit/credit card processor. An account of the customer/donor can then be charged or debited in the amount of the contribution, and the amount of the third-party fundraising organization can be credited appropriately.

U.S. Pat. No. 6,112,191 to Burke ("the '191 Patent"): This patent discloses a method and system to create excess funds from consumer spending transactions. However, the '191 Patent concerns collecting monetary contributions from a customer/donor [—] tendering an excess payment at a point-of-sale transaction. The '191 Patent utilizes an electronic cash register to determine an amount of excess funds created at a point-of-sale transaction. Through the electronic cash register, a customer/donor can make a check contribution, a credit card contribution, or a debit card contribution to a third-party. The electronic cash register determines the excess difference between a purchase price and the amount of payment tendered by the customer/donor. The excess difference is transmitted with customer account information from the electronic cash register to a clearinghouse central computer. The customer/donor may also select the amount of change to receive back as well as which charities to donate any remaining amount of change to. The clearinghouse central computer receives the information and then distributes remaining contribution amounts to respective charities.

In one embodiment of the '191 patent, a rounder system creates excess funds from excess payments without the cooperation or awareness of a payee who accepts payments for the purchase of services or goods. However, the rounder system concerns rounding payments for point-of-sale transactions for the purchase of goods or services. The rounder system adds or subtracts an amount of excess funds to the face amount of number of entries and then adjusts the account balance accordingly. The excess amount can be a rounder number or percentage that is applied to each account entry, e.g., $1.00, $3.00, 2%, or a specific number, $1.50, to create excess funds. In one embodiment, the rounder number is a whole dollar amount such as $1.00, $5.00, $10.00. The amount of excess funds is then displayed in the account and can be periodically transferred to third-party accounts such as charities.

U.S. Pat. No. 6,088,682 to Burke ("the '682 Patent"): This patent discloses a funds distribution system connected with point-of-sale transactions. However, the '682 Patent concerns collecting monetary contributions from a customer/donor tendering an excess payment at a point-of-sale transaction. The '682 Patent utilizes a remote input device, such as a cash register connected to a central computer, to enter a contribution amount from an amount of excess funds created at a point-of-sale transaction. Through the remote input device, a customer/donor can make a cash contribution, a check contribution, or a credit card contribution to a third-party. The remote input device receives an input from the customer/donor corresponding to the amount of a desired monetary contribution, such as the excess difference between a purchase price and the amount of payment tendered by the customer/donor. The amount of the monetary contribution is then transmitted with customer account information from the remote input device to a central computer. The customer/donor may also select the amount of change to receive back as well as which charities to donate any remaining amount of change to. The central computer receives the information and then distributes remaining contribution amounts to respective charities.

Other conventional systems and methods focus on direct and automatic payroll contributions to third-parties through a system and method for self-administered payroll deduction from an employee's gross pay. However, these conventional systems and methods concern allocating monetary funds from an employee's paycheck to pay for obligations owed by the employee.

For example, PCT Application No. PCT/US02/33584, published as International Publication No. WO 03/034186 A2 ("the PCT '186 Publication") is directed to a method allowing an employee to self-administer automatic payroll deductions from his gross pay and to transfer funds to a vendor. However, the method of the PCT '186 Publication concerns automatically deducting payments from an employee's payroll when a particular amount is specified by the employee.

Accordingly, a need exists for methods and systems for automatically determining and collecting a monetary contribution from an instrument (such as a paycheck or a bill).

Yet another need exists for methods and systems for automatically determining and collecting a monetary contribution from a donor associated with a financial instrument.

Another need exists for methods and systems for automatically determining and collecting a monetary contribution from a donor associated with a billing instrument.

Still another need exists for methods and systems for accounting and reporting collected monetary contributions from a donor associated with an instrument (such as a paycheck or a bill).

SUMMARY OF THE INVENTION

The invention addresses some or all of the needs described above. One embodiment of the invention provides a method for automatically determining and collecting a monetary contribution from an instrument associated with a donor. The method includes receiving an instrument; determining a currency amount of the instrument; and determining a monetary contribution. Determining a monetary contribution includes determining whether the instrument is a billing instrument or financial instrument. If the instrument is a financial instrument, the method provides for rounding the currency amount of the financial instrument downward to a lower currency amount; and determining the difference (a positive value) between the currency amount of the financial instrument and the lower currency amount, wherein the difference is the monetary contribution. If the instrument is a billing instrument, the method provides for rounding the currency amount of the billing instrument upward to a higher currency amount; and determining the difference (a positive value) between the higher currency amount and the currency amount of the billing instrument, wherein the difference is the monetary contribution. The method also includes collecting the monetary contribution into a target account. Algorithms associated with determining a monetary contribution useful in carrying out such systems and methods are described.

One aspect of the invention includes methods and systems for accounting and reporting collected monetary contributions. Regardless of which type of instrument or combination of instruments is processed, embodiments of the invention can account for and report collected monetary contributions to various entities associated with the contribution, including the donor, recipient or target of the monetary contribution, and/or a third-party that matches or supplements the monetary contribution.

Other aspects of the invention provide systems for automatically determining and collecting a monetary contribution from an instrument associated with a donor.

DETAILED DESCRIPTION OF SPECIFIC EMBODIMENTS

Figure 1:
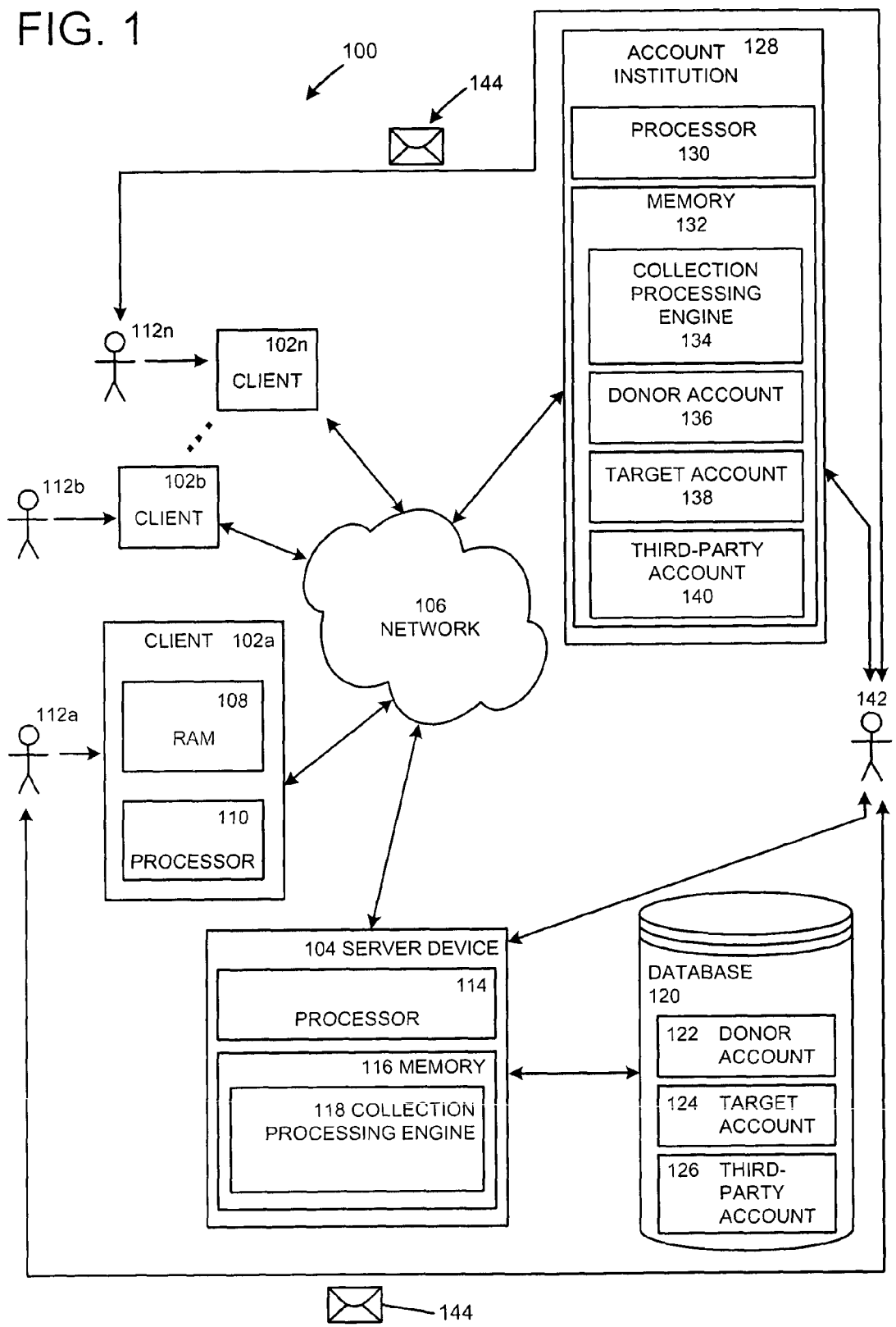
FIG. 1 illustrates a block diagram of a system in accordance with one embodiment of the invention.

The invention comprises methods and systems for automatically determining and collecting a monetary contribution from an instrument (such as a paycheck or a bill). The invention automates the implementation and management of collecting a monetary contribution from a donor associated with a financial, billing, or other instrument; and consolidating the monetary contribution into a target account for a third-party such as a charity. The invention can be implemented using an electronic financial or payroll processing system that handles financial-type instruments, billing-type instruments, or both types of instruments. Note that the terms "contribution" and "donation" are used interchangeably throughout the text of the specification.

Examples of an instrument are described as either a billing instrument or financial instrument. A billing instrument is an instrument that is billed or debited against monetary funds associated with a donor. Examples of a billing instrument include, but are not limited to, a bill, a utility bill, a services bill, a goods bill, a statement of account, a credit card bill, and a bill for a currency amount charged to the donor, a point-of-sale purchase, a credit card purchase statement, a debit card purchase statement, a check card purchase statement, an ATM card purchase statement, an electronic monetary transaction, and a smart card purchase statement. In some instances, a billing instrument can be in an electronic format with electronic data representing an amount to be billed or debited against monetary funds associated with a donor. In these instances, the electronic data can be processed by the system 100 as a billing instrument in accordance with the invention.

A financial instrument is an instrument that is deposited or credited towards monetary funds associated with a donor. Examples of a financial instrument include, but are not limited to, a paycheck, a payroll deposit, a payroll contribution, an interest payment, a stock dividend, a bank dividend, shares of stock, an instrument with a monetary value, a check, a monetary deposit, an incentive-program deposit, an electronic monetary transaction, and a smart card deposit. In some instances, a financial instrument can be in an electronic format with electronic data representing an amount to be deposited or credited towards monetary funds associated with a donor. In these instances, the electronic data can be processed by the system 100 as a financial instrument in accordance with the invention.

For example, a paycheck (a financial instrument) in the amount of $792.60 can be processed by the invention, and a donation of the change portion of the paycheck, e.g. $0.60, can be collected from an associated paycheck account (a donor account) and deposited into a target collection account (a target account) for a charity or other entity. Alternatively, for charges made to a customer on a periodic or recurring basis (a billing instrument), a donation can be the change portion a customer would have received had he or she paid his or her charges in cash to a charging company or vendor (e.g., $46.00−$45.65=$0.35). The respective change portion would be automatically debited from an associated customer account (donor account) and collected into a target collection account (target account) or otherwise directly transmitted to a charity or other entity. In another example, a customer is billed $23.45 for utility services (a billing instrument) provided by a utility company. A donation in the amount of $0.55 would be made when the total amount of the bill is rounded upward from $23.45 to $24.00. In any of the above embodiments, a paycheck, a recurring charge transaction, or utility bill could be processed by the invention to automatically determine and collect the change portion or other specified rounded level amount of the respective paycheck, recurring charge transaction, or utility bill for a charitable organization or other entity. Various parties to a monetary contribution, such as a donor, an employer, employee, charitable organization, matching sponsor organization, employee union, consumer or purchaser, charging company, and/or vendor, can be notified on a predetermined basis, e.g., an annual statement of the amounts of monetary contributions collected.

Note that a paycheck could be rounded down to a specified rounding level such as the next lower whole currency amount, e.g., a paycheck for $700.51 can be rounded down to $700.00. Alternatively, a charge transaction, credit card statement, or a bill should be rounded up to a specified rounding level such as the next higher whole currency amount, e.g., a recurring charge transaction for $45.65 can be rounded up to $46.00, a monthly credit card statement for $45.65 can be rounded up to $46.00, and a utility bill for $23.45 can be rounded up to $24.00. The respective rounded amount to the selected rounding level amount, in this case, the next lower or higher whole currency amount, also known as the "change portion," would be debited from the donor account and transferred or otherwise credited in a target account earmarked for donation to an entity such as a charitable organization or a fundraising entity.

Other embodiments of the invention can handle financial and/or billing instruments and other financial-type transactions such as a phone bill, a point-of-sale purchases, a credit card statement, or an automated paycheck deposit. The invention can handle various currency types, amounts, and other change or currency increments, e.g., coin amounts, dollars, Euros, earned interest or dividends, etc. Matching or supplemental funds from another entity, such as matching charitable contributions from an employer, can also be handled by the invention. Non-currency based contributions are also possible, such as a fractional increment in a share of stock or a mutual fund resulting from reinvested stock dividends, or cost-averaging purchases of a stock or mutual fund that result in non-integer numbers of shares.

Yet other embodiments of the invention can determine various contribution amounts in the form of selected rounded levels, percentages, predetermined multiple, fixed amount, or percentage of the currency amount.

Reference will now be made in detail to exemplary embodiments of the invention as illustrated in the accompanying drawings. The same reference numbers are used throughout the drawings and the following description to refer to the same or like parts.

Various systems in accordance with the invention may be constructed. FIG. 1 is a diagram illustrating an exemplary system in which exemplary embodiments of the invention may operate. The invention may operate, and be embodied in, other systems as well. The system 100 shown in FIG. 1 includes multiple client devices 102*a–n*, a server device 104, and a network 106. The network 106 shown is a financial transaction network. In other embodiments, other networks, such as the Internet, or an intranet may be used. The client devices 102*a–n* shown each include a computer-readable medium, such as a random access memory (RAM) 108 coupled to a processor 110. The processor 110 executes a set of computer-executable program instructions stored in memory 108. Client devices 102*a–n* may also include a number of external or internal devices such as a mouse, a CD-ROM, a keyboard, a display, or other input or output devices. Examples of client devices 102*a–n* are electronic cash registers, ATM machines, credit card/debit card processors, personal computers, digital assistants, personal digital assistants, cellular phones, mobile phones, smart phones, pagers, digital tablets, laptop computers, personal computers, and a processor-based device and similar types of systems and devices. In general, a client device 102*a–n* may be any type of processor-based platform connected to a network 106 and that interacts with one or more application programs.

Through the client devices 102*a–n*, users 112*a–n* can communicate over the network 106 with each other and with other systems and devices coupled to the network 106. As shown in FIG. 1, a server device 104 is also coupled to the network 106. Similar to the client devices 102*a–n*, the server device 104 shown includes a processor 114 coupled to a computer readable memory 116. Server device 104, depicted as a single computer system, may be implemented as a network of computer processors. Examples of a server devices 104 are servers, mainframe computers, networked computers, a processor-based device, and similar types of systems and devices.

Memory 116 contains a collection processing application program, also known as the collection-processing engine 118. In the embodiment shown, the collection-processing engine 118 comprises computer code residing in the memory 116. The collection-processing engine 118 is adapted to determine a currency amount of an instrument (such as a paycheck or a bill). The collection-processing engine 118 is also adapted to determine whether a particular instrument is a financial or a billing instrument, or otherwise executes a set of instructions to determine the type of instrument. The collection-processing engine 118 is further adapted to determine a monetary contribution from an instrument, and to collect the monetary contribution into a target account. For example, the collection-processing engine 118 can be an adaptation of a bill-paying service used by a donor. Examples of a bill-paying service subject to such adaptation are those offered by banks, savings and loan associations, credit unions, brokerages, or accounting services. The collection-processing engine 118 can be an element of a service offered to a donor by an account institution associated with a target account holder. For example, a target account holder, such as a charitable organization, might offer a bill-payment service aimed at both processing of bills and collection of donations based on the methods and systems described herein.

The collection-processing engine 118 can also be adapted to determine a supplemental contribution. The collection-processing engine 118 can access, in memory 116 or from another data source, information associated with potential or designated supplemental contributors or third-parties and the terms of any supplemental contributions. Supplemental contributors or third-parties, such as an employer offering a matching contribution to a donor employee's monetary contribution, can offer incentive matching programs that last for a specified period, or they can match particular groups of donor groups, or they can "double" match any existing match.

The collection-processing engine 118 is further adapted to account for and to report collected monetary contributions to various entities associated with the contribution, including the donor, recipient or target of the monetary contribution, and/or a third-party that matches or supplements the monetary contribution. For example, a notification could be transmitted by the collection-processing engine 118 in the form of a message sent to a donor associated with a donor account, a message sent to an entity associated with a target account, or a message sent to a third-party associated with a third-party account. Note that other functions and characteristics of the collection-processing engine 118 are further described below.

Database 120 includes a donor account 122, a target account 124, and a third-party account 126. The database 120 is a data storage device adapted to receive and to store information processed by the server 104 or collection-processing engine 118. The database 120 shown is a separate data storage device in communication with the server 104, but in other embodiments, could be incorporated with the server 104. Data storage devices may include any one or combination of methods for storing data, including without limitation, hashtables, lists, and pairs. Other similar types of data storage devices can be accessed by the server device 104. Note that the data storage of the database 120 could be distributed and each of the accounts 122, 124, 126 can be in separate but linked locations.

The donor account 122 is a financial record associated with a donor. When a user 112a–n utilizes the system 100 to make a monetary contribution to a recipient, the user 112a–n becomes a donor. To facilitate transfer of the monetary contribution from the donor to the recipient, a donor account 122 can be used to track monies associated with the donor. Examples of a donor account include, but are not limited to, a bank account, a savings account, a money market account, a cash account, a credit account, a debit account, a charge account, a dividend account, a payroll account, a brokerage account, an account with a financial institution, and a record that can track a currency amount.

The target account 124 is a financial record associated with a recipient of the monetary contribution. When a user 112a–n utilizes the system 100 to make a monetary contribution to a recipient, the user 112a–n can select the recipient of the monetary contribution. To facilitate transfer of the monetary contribution from the donor to the recipient, a target account 124 can be used to track monies associated with the recipient. Examples of a target account are similar to those described above with respect to the donor account.

The third-party account 126 is a financial record associated with a third-party. When a user 112a–n utilizes the system 100 to make a monetary contribution to a recipient, a third-party can match the user's monetary contribution or otherwise supplement the monetary contribution by transferring monies to the target account 124. To facilitate transfer of monies from the third-party to the recipient, a third-party account 124 can be used to track monies associated with n third-party making a matching or supplemental contribution to the recipient. Examples of a third-party account are similar to those described above with respect to the donor account 122 and target account 124.

While each of the accounts 122, 124, 126 shown are financial-type records, in some embodiments the accounts 122, 124, 126 can be hashtables, lists, pairs, counters, other data storage devices, or other elements or devices to track currency amounts. Greater or fewer numbers of each type of account 122, 124, 126 can also be stored in the database 120 shown.

Account institution 128 is also coupled to the network 106. Similar to the client devices 102a–n and the server device 104, the account institution 128 shown includes a processor 130 coupled to a computer readable memory 132. Account institution 128 is depicted as a single computer system, but may be implemented as a network of computer processors. Examples of an account institution 128 are servers, mainframe computers, networked computers, a processor-based device, and similar types of systems and devices. Client processors 110, server processor 114, and account institution processor 130 can be any of a number of well known computer processors, such as processors from Intel Corporation of Santa Clara, Calif.; Advanced Micro Devices (AMD) Corporation of Sunnyvale, Calif.; and Motorola Corporation of Schaumburg, Ill.

Memory 132 can also contain a collection processing application program or collection-processing engine 134, similar to that shown and described above as 118.Memory 132 includes a donor account 136, a target account 138, and a third-party account 140. The memory 132 is a data storage device adapted to receive and to store information processed by the account institution 128 or collection-processing engine 134. Note that the date storage of the memory 132 could be distributed and each of the accounts 136, 138,140 can be in separate but linked locations.

The donor account 136 is a financial record associated with a donor similar to that shown and described above as 122. The target account 138 is a financial record associated with a recipient of the monetary contribution similar to that shown and described above as 124. The third-party account 140 is a financial record associated with a third-party similar to that shown and described above as 126. The accounts 136, 138, 140 are similar to the accounts shown and described above as 122, 124, 126. Greater or fewer numbers of each type of account 136, 138, 140 can be stored in the memory 132 shown.

Administrator 142 can be associated with the server device 104 and/or the account institution. The administrator 142 provides information received from users 112a–n transmitted by means 144 outside of the network 106. Means 144 outside of the network 106 can include mail delivery by a courier or deliveryman. When the administrator receives information via means 144 outside of the network 106, the administrator 142 can enter or otherwise input information to the collection-processing engine 118, 134 via an input device (not shown) such as a keyboard, voice-recognition processor, or scanner. The collection-processing engine 118, 134 processes information received from users 112a–n via the administrator 142 in a similar manner as described above with respect to the network 106. Likewise, information can be provided by the collection-processing engine 118, 134 to the administrator 142. The administrator can transmit the information to users 112a–n via means 144 outside of the network 106.

It should be noted that the invention may comprise systems having different architectures than that which is shown in FIG. 1. For example, in some systems according to the invention, the collection-processing engine 118 and database 120 may not be part of the server 104 or the account institution 128, and may carry out modification of collection data or other operations offline. One example of another embodiment includes a first collection-processing engine that processes a billing instrument for a utility company. The collection-processing engine can notify a customer of an amount to pay the utility company including a monetary contribution. Once the amount is paid, the first collection-processing engine may transmit a currency amount of a monetary contribution to the account institution where a second collection-processing engine may handle the distribution of monies from an account associated with the utility company to a target account associated with a charitable organization. The second collection-processing engine may transmit information to a third collection-processing engine associated with a target or recipient of the monetary contribution such as a charitable organization, where the third collection-processing engine may report the monetary contribution to the customer/donor, the utility company, and to the target.

Note that the system 100 shown in FIG. 1 is merely exemplary, and is used to explain the exemplary methods shown in FIGS. 2–5. These and other aspects of embodiments of the invention are described further herein. These and other steps taken in methods according to the invention may be stored in the form of program code in a computer-readable medium, such as memory associated with a processor, a disk, or other computer-readable medium.

Figure 2:
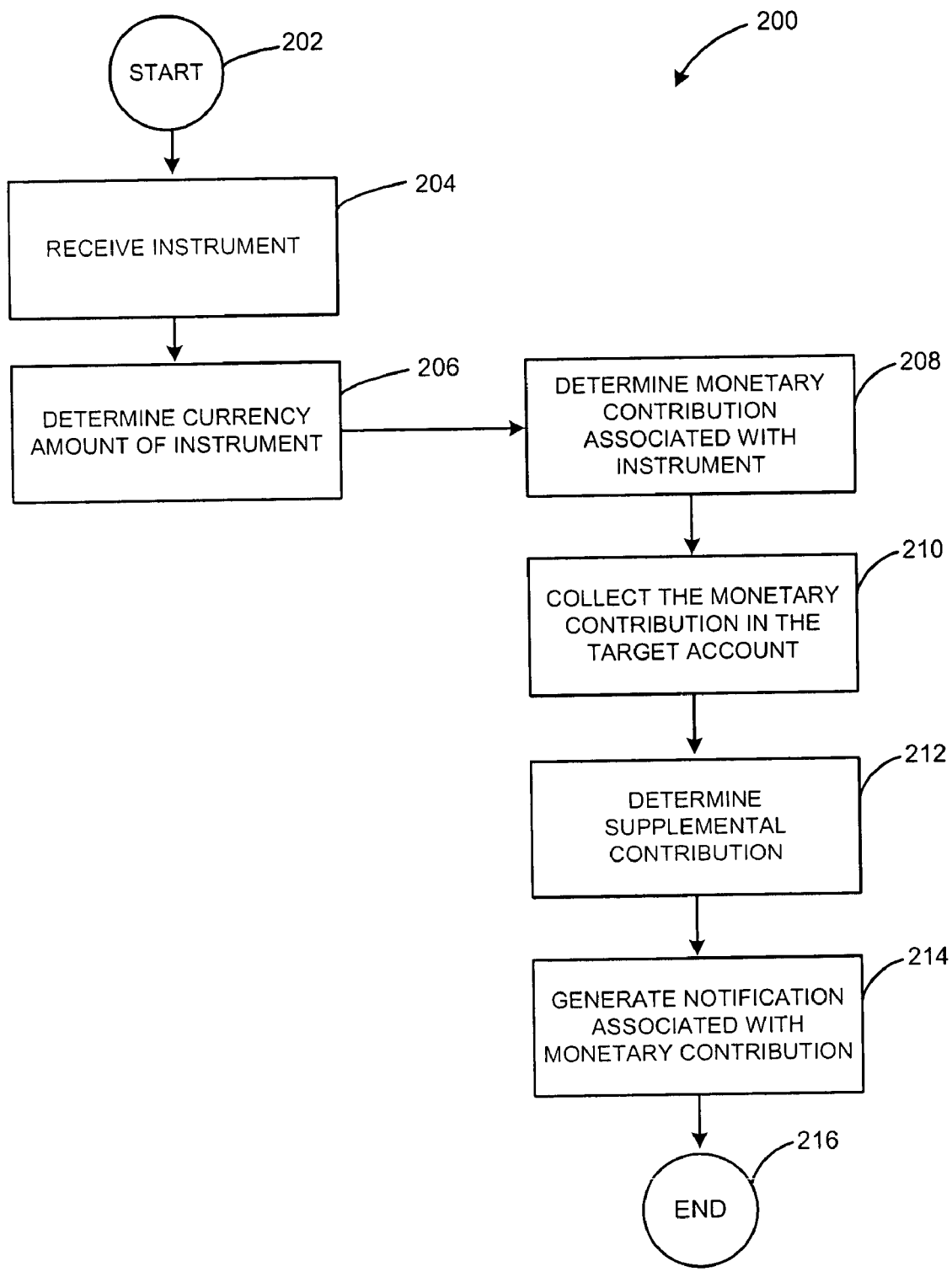
FIG. 2 illustrates a flow diagram of a method in accordance with one embodiment of the invention.

FIG. 2 illustrates a flow diagram of an exemplary method 200 in accordance with the invention. The method 200 can he executed or otherwise performed by any of various systems. The method 200 is described below as carried out by the system 100 shown in FIG. 1 by way of example, and various elements of the system 100 are referenced in explaining the example methods of FIGS. 2–3. The method 200 shown provides a method for determining and collecting a monetary contribution from an instrument associated with a donor. Each block shown in FIG. 2 represents one or more steps carried out in the exemplary method 200. Referring to FIG. 2, in block 202, the example method 200 begins. In block 204, an instrument is received. The collection-processing engine 118 at the server or the collection-processing engine 134 at the account institution 128, receives the instrument or information associated with the instrument for processing by the method 200. In any instance, the collection-processing engine 118, 134 obtains financial and/or billing information associated with the instrument. In some instances, the instrument includes electronic data that have been transmitted to the collection-processing engine via the network 106. In other instances, the instrument includes data that have been received via other means 144, and keyed or otherwise input to the collection-processing engine 118, 134 by an administrator 142. Information collected by the collection-processing engine 118, 134 can include, but is not limited to, address information, routing data, donor information, employer data, employee identification data, matching or supplemental contributor information, tax identification data, bank identification data, account identification data, donor data, target data, customer data, vendor data, brokerage data, currency amount of the instrument, date of the instrument, and guarantor of the instrument.

Block 204 is followed by block 206, in which a currency amount of the instrument is determined. The collection-processing engine 118, 134 obtains information associated with the instrument that includes a currency amount associated with either a financial-type or billing-type transaction. The currency amount can be associated with any currency designation, such as U.S. dollars, Euros, Pounds, Yen, Yuan, or any other international monetary standard.

For example, an instrument associated with a financial-type transaction, such as a paycheck from an employer to an employee in the amount of $792.60, can be received by the collection-processing engine 134 at the account institution 128. In some instances, the paycheck or other instrument may be in an electronic format with electronic data associated with the paycheck or instrument. In any instance, the collection-processing engine 134 can determine that the currency amount of the paycheck is "$792.60." Alternatively, a billing instrument such as a recurring charge statement in the amount of $45.65 can be received by the collection-processing engine 118 at the server 104. In some instances, the recurring charge statement or other instrument may be in an electronic format with electronic data associated with the recurring charge statement or instrument. In this instance, the collection-processing engine 118 can determine the currency amount of the recurring charge statement is "$45.65." In yet another example, a collection-processing engine 134 at the account institution 128 processes a utility bill for a particular customer in the amount of $23.45 for utility services provided by a utility company. In this instance, the collection-processing engine 134 determines the currency amount of the bill to be "$23.45."

Block 206 is followed by subroutine 208, in which a monetary contribution associated with the instrument is determined. The collection-processing engine 118, 134 calculates a monetary contribution depending upon whether the instrument is a financial or billing instrument. For example, an instrument from an employer of a prospective donor could be determined to be a paycheck, in which case the instrument is determined to be a financial instrument, and an appropriate monetary contribution is calculated. Alternatively, an instrument from a customer at a retail store could be determined to be a payment for goods or services, in which case, the instrument is determined to be a billing instrument, and an appropriate monetary contribution is calculated. The appropriate calculations are described as follows.

Figure 3:
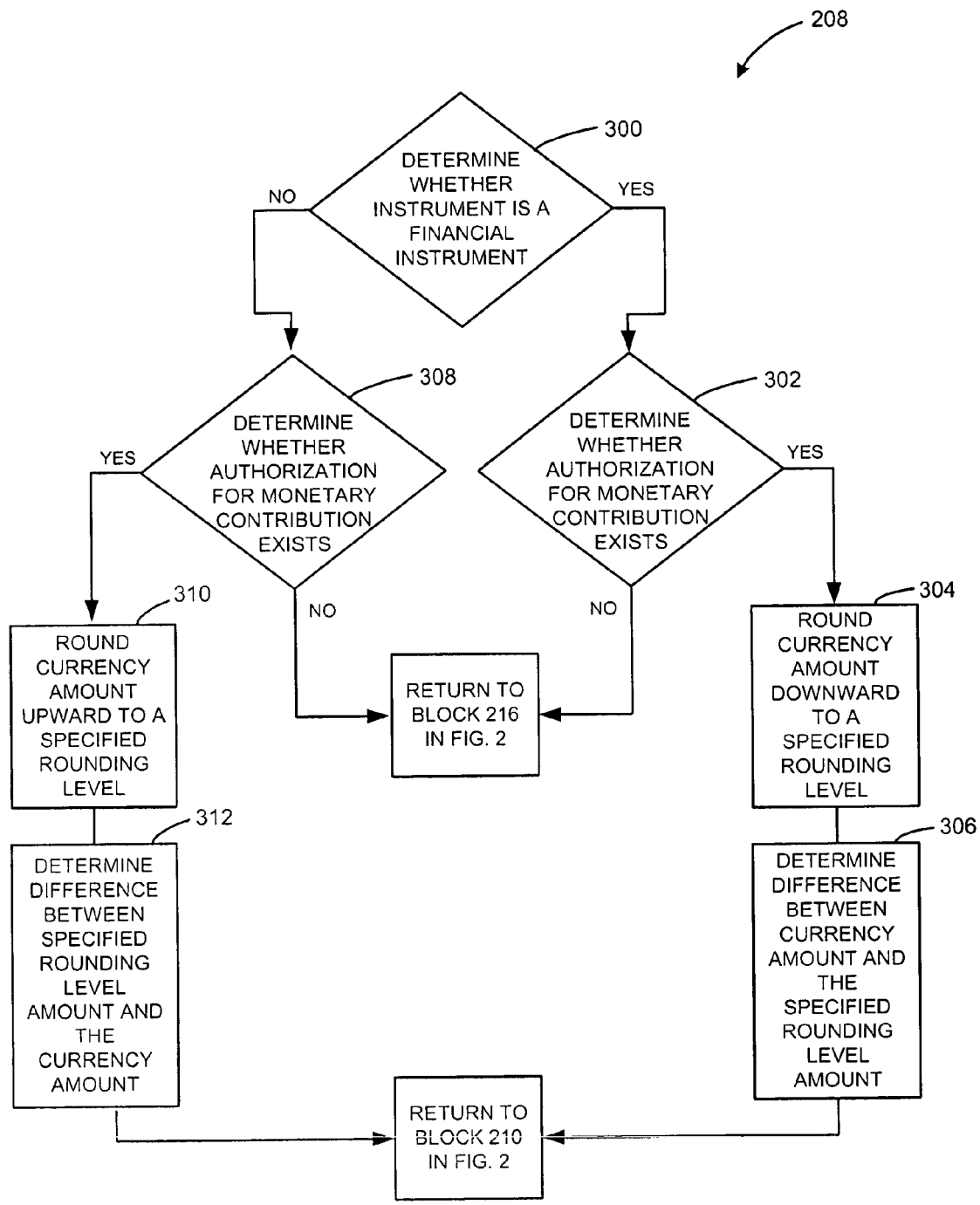
FIG. 3 illustrates a flow diagram of a subroutine of the method shown in FIG. 2.

Referring to FIG. 3, in decision block 300, the example subroutine 208 begins. In decision block 300, a determination is made as to whether the instrument is a financial instrument. This determination could be made according to a preset determination, a predefined set of rules, or based on the relationship between the donor and the type of transaction or instrument being evaluated. Note that in some embodiments, an initial determination can be made as to whether the instrument is a billing instrument. Similarly, this determination could be made according to a preset determination, a predefined set of rules, or based on the relationship between the donor and the type of transaction or instrument being evaluated. In any instance, the determination made at decision block 300 distinguishes between a financial instrument and a billing instrument. Referring back to decision block 300, if the instrument is a financial instrument, then the "YES" branch is followed to decision block 302.

In decision block 302, a determination is made as to whether authorization for a monetary contribution exists. Authorization for a monetary contribution is provided by a donor or an entity operating on behalf of the donor. An authorization can be in the form of previously stored instructions in memory 116, 132, database 120, or another data storage device accessible by the collection-processing engine 118, 134 to determine whether authorization exists. Authorization can include, but is not limited to, instructions for a particular instrument, instructions for a particular period of time, and instructions for a particular transaction involving an instrument. For example, authorization could include instructions to determine a monetary contribution from all monthly billing instruments or monthly utility bills from a particular donor's utility company.

In some embodiments, authorization could be obtained in real time by contacting a potential donor 112a–n associated with the instrument. Contact could be made by transmitting a message via the network 106 to a client 102a–n associated with a potential donor 112a-n. Feedback from the potential donor 112a–n in the form of a message with authorization instructions could be returned from the client 102a–n to the collection-processing engine 118, 134.

If authorization does not exist for a particular instrument, then the "NO" branch returns to block 216 in FIG. 2 and no monetary contribution is determined for the particular instrument.

If however, authorization does exist for a particular instrument, then the "YES" branch is followed to block 304. In block 304, the currency amount of the financial instrument is rounded downward to a specified rounding level amount. The collection-processing engine 118, 134 takes the currency amount determined previously at block 206 and rounds the currency amount downward to a specified rounding level amount. The specified rounding level is determined from a predefined algorithm or formula. From the example above, the paycheck is determined to have a currency amount of $792.60. The collection-processing engine rounds the currency, amount to a specified rounding level, in this case, the next lower whole currency amount of $792.00. The next lower whole currency amount is represented by an integer portion "792" without a decimal portion. That is, the decimal portion is null or zero. Selection of a specified rounding level such as the next lower whole currency amount provides the donor with monetary funds from the paycheck in a rounded whole dollar amount, $792.00, thus making an accounting of the remaining currency amount of the paycheck easier to process by a donor. In other embodiments of the method, the currency amount could be rounded downward to a specified rounding level including, but not limited to, a specified rounding level or amount, a predetermined multiple currency amount, fixed amount, or percentage of the currency amount. For example, a collection-processing engine could round down the currency amount of $792.60 in various increments such as $5 or $10 increments added to the change portion of the currency amount, resulting in a specified rounding level amount of $5.60 or $10.60, respectively. Non-order-of-magnitude increments could also be used as a specified rounding level such as "the next lowest even $5 level," thus from the example above, a specified rounding level amount would be $2.60. Other embodiments could call for a specified rounding level such as an "even level that is evenly divisible by the specified value with no fractional component remaining." Thus the following could be determined for a financial instrument in which the specified rounding level amount based on an even value is defined as: the specified rounding level times the integer part ("INT") of the instrument amount divided by the specified rounding level (e.g., 10*INT ($792.60/10)=$790). For a billing instrument, the specified rounding level amount based on an even value is defined as: the specified rounding level times the quantity one pills the integer part of the instrument amount divided by the specified rounding level. (e.g., 10*[1+INT ($23.65/10)]=10*3=$30).

Block 304 is followed by block 306, in which a difference between the currency amount of the financial instrument and the lower currency amount is determined. In the example described above, the collection-processing engine 118, 134 performs a mathematical calculation on the currency amount determined previously at block 206 and the next lower whole currency amount determined previously at block 304. The difference (a positive value) between the amounts from blocks 304 and 206 is an amount of currency from the instrument that will be a monetary contribution from the donor to another entity. Typically, the entity to receive the monetary contribution is the holder of a target account.

By way of example, the following mathematical algorithm provides a desired result for a financial instrument:

Difference=Currency Amount of Instrument−Next Rounded Currency Amount

From the example above, the paycheck amount determined at block 206 is $792.60, and the next lower whole currency amount determined at block 304 is $792.00. Implementing the mathematical algorithm above provides a difference between the amounts from blocks 304 and 206 of $0.60. Therefore, the amount to be contributed from the paycheck is the change portion from the currency amount of the instrument, or $0.60.

The subroutine 208 then returns to block 210 in FIG. 2.

If, however in decision block 300, the instrument is determined not to be a financial instrument, then the instrument is a billing instrument and "NO" branch is followed to decision block 308.

In decision block 308, a determination is made as to whether authorization for a monetary contribution exists. Authorization for a monetary contribution is provided by a donor or an entity operating on behalf of the donor. An authorization can be in the form of previously stored instructions in memory 116, 132, database 120, or another data storage device accessible by the collection-processing engine 118, 134 to determine whether authorization exists. In some embodiments, authorization could be obtained in real time by contacting a potential donor 112*a–n* associated with the instrument. Contact could be made by transmitting a message via the network 106 to a client 102*a–n* associated with a potential donor 112*a–n*. Feedback from the potential donor 112*a–n* in the form of a message with authorization instructions could be returned from the client 102*a–n* to the collection-processing engine 118, 134.

If authorization does not exist for a particular instrument, then the "NO" branch returns to block 216 in FIG. 2, and no monetary contribution is determined for the particular instrument.

If however, authorization does exist for a particular instrument, then the "YES" branch is followed to block 310.

In block 310, the currency amount of the instrument is rounded upward to a specified rounding level amount. For example, the collection-processing engine 118, 134 receives the currency amount determined previously at block 206 and rounds the currency amount upward to a specified rounding level amount such as the next higher whole currency amount. From the example described previously, a utility bill is determined to have a currency amount of $23.45. The collection-processing engine rounds the currency amount to a specified rounding level, in this case, the next higher whole currency amount of $24.00. The next higher whole currency amount is represented by an integer portion "24" without a decimal portion. That is, the decimal portion is null or zero. Selection of a specified rounding level such as the next whole currency amount provides the donor with a bill from the utility bill in a next higher whole currency amount, $24.00, thus making an accounting of the remaining currency amount of the utility bill easier to process by a donor. In other embodiments of the method, the currency amount could be rounded upward to a specified rounding level including, but not limited to, a specified rounding level or amount, a predetermined multiple, fixed amount, or percentage of the currency amount.

For example, a collection-processing engine could round up the currency amount of $23.45 in various increments such as $5 or $10 increments added to the difference between the next higher rounded currency amount and the currency amount, resulting in a specified rounding level amount of $5.55 or $10.55, respectively. Non-order-of-magnitude increments could also be used as a specified rounding level such as "the next highest even $5 level," thus from the example above, a specified rounding level amount would be $1.55. Generalizing the latter example, other embodiments could call for a specified rounding level such as an "even level that is evenly divisible by the specified value with no fractional component remaining." Thus, a specified rounding level amount based on an even value could be defined as the specified rounding level times the quantity one plus the integer part of the instrument amount divided by the specified rounding level, (e.g. 10*[1+TNT ($23.45/10)]10*3$30).

Block 310 is followed by block 312, in which a difference between the specified rounding level amount and the currency amount of the billing instrument is determined. The collection-processing engine 118, 134 performs a mathematical calculation on the currency amount determined previously at block 206 and the higher currency amount determined previously at block 310. The difference (a positive value) between the amounts from blocks 310 and 206 is an amount of currency from the instrument that will be a monetary contribution from the donor to another entity. Typically, the entity to receive the monetary contribution is the holder of a target account.

By way of example, the following mathematical algorithm provides a desired result for a billing instrument:

Difference=Next Rounded Currency Amount−Currency Amount of Instrument

From the example above, the utility bill currency amount determined at block 206 is $23.45, and the next higher whole currency amount determined at block 310 is $24.00. Implementing the mathematical algorithm above provides a difference between the amounts from blocks 310 and 310 of $0.55. Therefore, the amount to be contributed from the utility bill is the change portion from the currency amount of the instrument, or $0.55.

The subroutine 208 then returns to block 210 in FIG. 2.

Subroutine 208 is followed by block 210, in which the monetary contribution is collected into a target account. The collection-processing engine 118, 134 determines the amount of the monetary contribution, and then credits a target account with the amount of the monetary contribution. The target account receives the amount of the monetary contribution such that an entity associated with the target account can access some or all of the monetary contribution.

Depending upon whether a financial or billing instrument is processed by the method 200, the rounded down currency amount of the financial instrument from block 304 or the rounded up currency amount of the billing instrument from block 310 is credited or debited to a donor account accordingly. In most instances, the donor account receives the rounded currency amount from the financial instrument, or the donor account is debited by the rounded currency amount of the billing instrument such that a donor associated with the donor account can access some or all of the resulting monetary funds in the donor account. In debiting the donor account by the rounded currency amount from the billing instrument, the collection-processing engine 118, 134 pays the billing instrument from monetary funds in the donor account. In most instances, payment of the rounded currency amount from the billing instrument from the donor account secures the amount of the monetary contribution prior to transferring the monetary contribution to the target account.

Block 210 is followed by block 212, in which a supplemental contribution is determined. In some instances, the collection-processing engine 118, 134 receives instructions to supplement a monetary contribution. The instructions can be received prior to, during, or after collecting the monetary contribution to the target account. The collection-processing engine 118, 134 implements the instructions, and depending upon the instructions, determines a currency amount for a supplemental contribution. If a supplemental contribution is determined, from a donor or a matching contributor, the supplemental contribution can then be credited to the target account.

For example, an instruction to a collection-processing engine 118, 134 can be to match the monetary contribution from a particular donor by contributing a matching currency amount from a third-party to the target account. In this example, if the currency amount of the monetary contribution from a paycheck was $0.60, and the donor is associated with a particular employer, the instruction could be to contribute a matching contribution of $0.60 from a third-party account associated with the donor's employer to the target account. Other instructions including various multiples, increments, incentive increments, compound matching increments, or percentages of a currency amount for a supplemental contribution can be facilitated with the method 200 in accordance with other embodiments of the invention.

Block 212 is followed by block 214, in which a notification associated with the monetary contribution is generated. The collection-processing engine 118, 134 transmits a notification regarding the monetary contribution via the network 106 to a party associated with the monetary contribution. The notification can be sent to a donor associated with a donor account, an entity associated with a target account, and/or a third-party associated with a third-party account. The notification can also be defined by time, such as consolidating and reporting monetary contributions from a particular individual or groups of individuals at specified times, such as monthly or quarterly. The notification can be a wireless message, an electronic mail message, electronic statement, a facsimile message, a messaging service message, or another type of message or mail that is transmitted via a network. Notification can also be generated in a hard copy or paper format and transmitted via regular mail, facsimile, or another method or device. The notification can inclued but is not limited to, a statement of the currency amount of the monetary contribution, a periodic statement of monetary contributions made by a particular donor over a period of time, or a statement of collected monetary and/or supplemental contributions made to an account. Notification can also include a consolidated statement of all monetary contributions made by a particular donor from all transactions involving billing and/or financial instruments.

Block 214 is followed by block 216, in which the method 200 ends.

Note that the method 200 can be repeated in an iterative fashion to automatically determine and collect a monetary contribution for a predefined period of time. In these instances, a collection-processing engine 118, 134 receives instructions to determine and to collect a monetary contribution for each instrument received for a predefined period of time or activity. The collection-processing engine 118, 134 processes each instrument received for the predefined period of time or activity, and determines monetary contributions for collection to the target account as described above. A predefined period of time can include, but is not limited to, a day, a week, a pay period, a month, a year, or a term of employment for a donor. A predefined activity can include, but is not limited to, every purchase, every other purchase, every deposit into an account, or every other deposit into an account.

Figure 4:
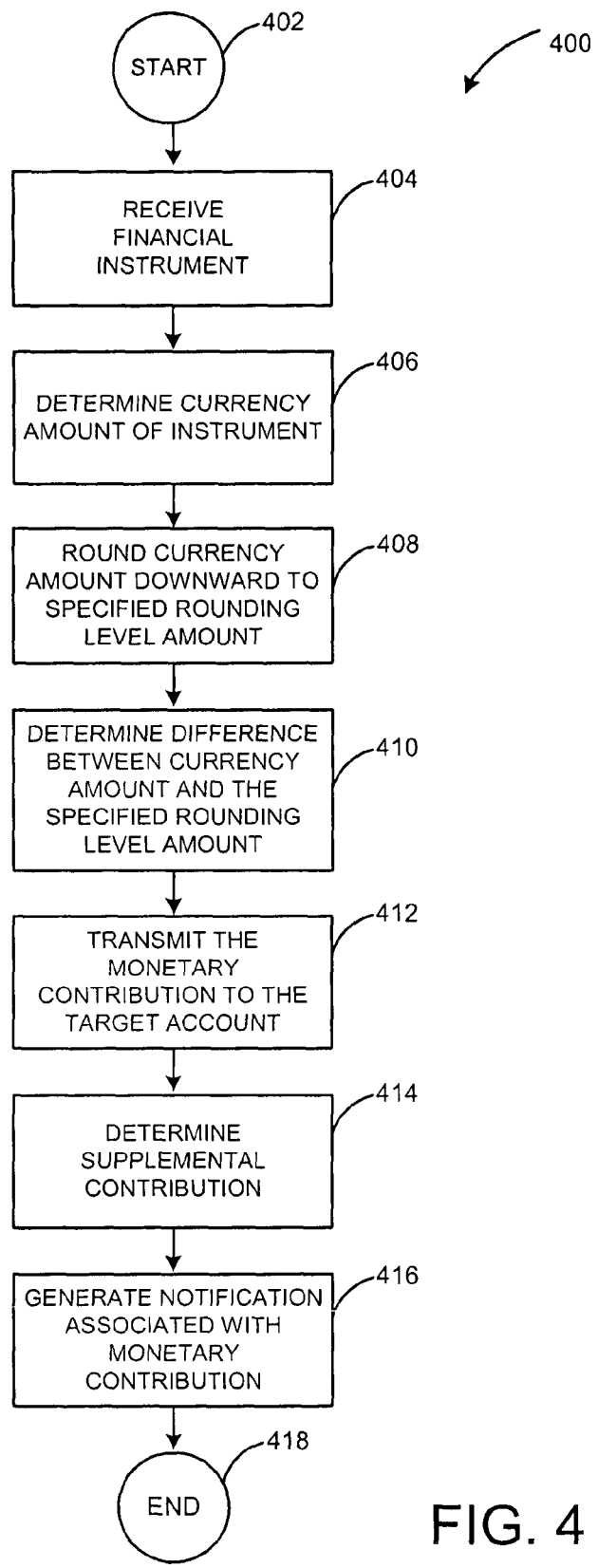
FIG. 4 illustrates a flow diagram of another method in accordance with one embodiment of the invention associated with a financial instrument.

FIG. 4 illustrates an example of another method 400 in accordance with the invention. The method 400 determines and collects a monetary contribution from a financial instrument associated with a donor. The method 400 begins at block 402.

Block 402 is followed by block 404, in which a financial instrument is received. The collection-processing engine 118 at the server or the collection-processing engine 134 at the account institution 128, receives the financial instrument for processing by method 400. In either case, the collection-processing engine 118, 134 obtains financial information associated with the financial instrument. In some instances, the financial instrument includes electronic data that have been transmitted to the collection-processing engine by a third-party. In other instances, the financial instrument includes data that have been keyed or otherwise input to the collection-processing engine by a third-party. Information collected by the collection-processing engine can include, but is not limited to, address information, donor information, routing data, employer information, employee identification data, tax identification data, matching-contributor information, bank identification data, account identification data, payor data, payee data, currency amount of the financial instrument, date of the financial instrument, and guarantor of the financial instrument.

In some embodiments, the collection-processing engine 118, 134 can determine whether authorization to determine a monetary contribution exists from a donor or an entity associated with a donor. If authorization is determined to exist, the method 400 would then proceed. If, however, no instructions existed, then the method 400 would end. An authorization can be in the form of previously stored instructions in memory 116, 132, database 120, or another data storage device accessible by the collection-processing engine 118, 134 to determine whether authorization exists. For example, authorization can include, but is not limited to, instructions for a particular instrument, instructions for a particular period of time, instructions for a particular transaction involving an instrument, or real time instructions received from a donor or entity associated with a donor.

Block 404 is followed by block 406, in which a currency amount of the financial instrument is determined. For example, a financial instrument such as a paycheck in the amount of $792.60 can be received by the collection-processing engine 134 at the account institution 128. The collection-processing engine 134 can determine that the currency amount of the paycheck is "$792.60."

Block 406 is followed by block 408, in which the currency amount of the financial instrument is rounded downward to a specified rounding level amount. The collection-processing engine 118, 134 receives the currency amount determined previously at block 406 and rounds the currency amount downward to a specified rounding level such as a next lower whole currency amount. From the example above, the financial instrument is determined to have a currency amount of $792.60. The collection-processing engine rounds the currency amount to the specified rounding level, in this case, the next lower whole currency amount of $792.00. Selection of the specified rounding level such as the next lower whole currency amount provides the donor with monetary funds from the paycheck in a rounded whole dollar amount, $792.00, thus making an accounting of the remaining currency amount of the paycheck easier to process by a donor. The next lower whole currency amount is represented by an integer portion "792" without a decimal portion. That is, the decimal portion is null or zero. In other embodiments of the method, the currency amount could be rounded downward to a specified rounding level including, but not limited to, a specified rounding level or amount, a predetermined multiple, fixed amount, or percentage of the currency amount.

Block 408 is followed by block 410, in which a difference between the currency amount of the financial instrument and the specified rounding level amount is determined. The collection-processing engine 118, 134 performs a mathematical calculation on the currency amount determined previously at block 406 and the specified rounding level amount such as the next lower whole currency amount determined previously at block 408. The difference (a positive value) between the amounts from blocks 406 and 408 is an amount of currency from the instrument that will be a monetary contribution from the donor to another entity. Thus, the collection-processing engine 118, 134 calculates a monetary contribution using the currency amount of the financial instrument and the next lower whole currency amount. A mathematical algorithm or set of instructions with a mathematical algorithm uses the currency amount of the financial instrument and the specified rounding level amount, in this case the next lower whole currency amount, as variables to determine the monetary contribution. By way of example, the following mathematical algorithm provides a desired result for a financial instrument:

Difference=Currency Amount of Instrument−Next Rounded Currency Amount

From the example above, the paycheck amount determined at block 406 is $792.60, and the next lower whole currency amount determined at block 408 is $792.00. Implementing the mathematical algorithm above provides a difference between the amounts from blocks 406 and 408 of $0.60. Therefore, the amount to be contributed from the paycheck is the change portion from the currency amount of the instrument, or $0.60.

Block 410 is followed by block 412, in which the monetary contribution is transmitted to a target account. The collection-processing engine 118, 134 determines the amount of the monetary contribution, and then credits a target account with the amount of the monetary contribution. The target account receives the amount of the monetary contribution such that an entity associated with the target account can access the monetary contribution.

Likewise, from the example above, the next lower whole currency amount of the financial instrument from block 408 is credited to a donor account. The donor account receives the rounded currency amount from the financial instrument such that a donor associated with the donor account can access the rounded currency amount.

Block 412 is followed by block 414, in which a supplemental contribution is determined. In some instances, the collection-processing engine 118, 134 receives instructions to supplement a monetary contribution. The instructions can be received prior to, during, or after transmitting the monetary contribution to the target account. The collection-processing engine 118, 134 implements the instructions, and depending upon the instructions, determines a currency amount for a supplemental contribution. If a supplemental contribution is determined, the supplemental contribution can then be transmitted to the target account.

For example, an instruction to a collection-processing engine 118, 134 can be to match the monetary contribution from a particular donor by contributing a matching currency amount from a third-party to the target account. In this example, if the currency amount of the monetary contribution were $0.60, and the donor is associated with a particular employer, the instruction could be to contribute a matching contribution of $0.60 from a third-party account associated with the donor's employer to the target account. Other instructions including various multiples, increments, incentive increments, compound-matching increments, or percentages of a currency amount for a supplemental contribution can be facilitated with the method 400 in accordance with other embodiments of the invention.

Block 414 is followed by block 416, in which a notification associated with the monetary contribution is generated. The collection-processing engine 118, 134 transmits a notification regarding the monetary contribution via the network 106 to an entity associated with the monetary contribution. The notification can be sent to a donor associated with a donor account, an entity associated with a target account, and/or a third-party associated with a third-party account. The notification can also be defined by time, such as consolidating and reporting monetary contributions from a particular individual or groups of individuals at specified times, such as monthly or quarterly. The notification can be a wireless message, an electronic mail message, electronic statement, a facsimile message, a messaging service message, or another type of message or mail that is transmitted via a network.

Notification can also be generated in a hard copy or paper format and transmitted via regular mail, facsimile, or another method or device. The notification can include, but is not limited to, a statement of the currency amount of the monetary contribution, a periodic statement of monetary contributions made by a particular donor over a period of time, or a statement of collected monetary and/or supplemental contributions made to an account. Notification can also include a consolidated statement of all monetary contributions made by a particular donor from all transactions involving billing and/or financial instruments.

Block 416 is followed by block 418, in which the method 400 ends.

Note that the method 400 can be repeated in an iterative fashion to automatically determine and to collect a monetary contribution for a predefined period of time. In these instances, a collection-processing engine 118, 134 receives instructions to determine and to collect a monetary contribution for each instrument received for a predefined period of time or activity. The collection-processing engine 118, 134 processes each instrument received for the predefined period of time or activity, and determines the monetary contributions for collection to the target account as described above. A predefined period time can include, but is not limited to, a day, a week, a pay period, a month, a year, or a term of employment of a donor.

Figure 5:
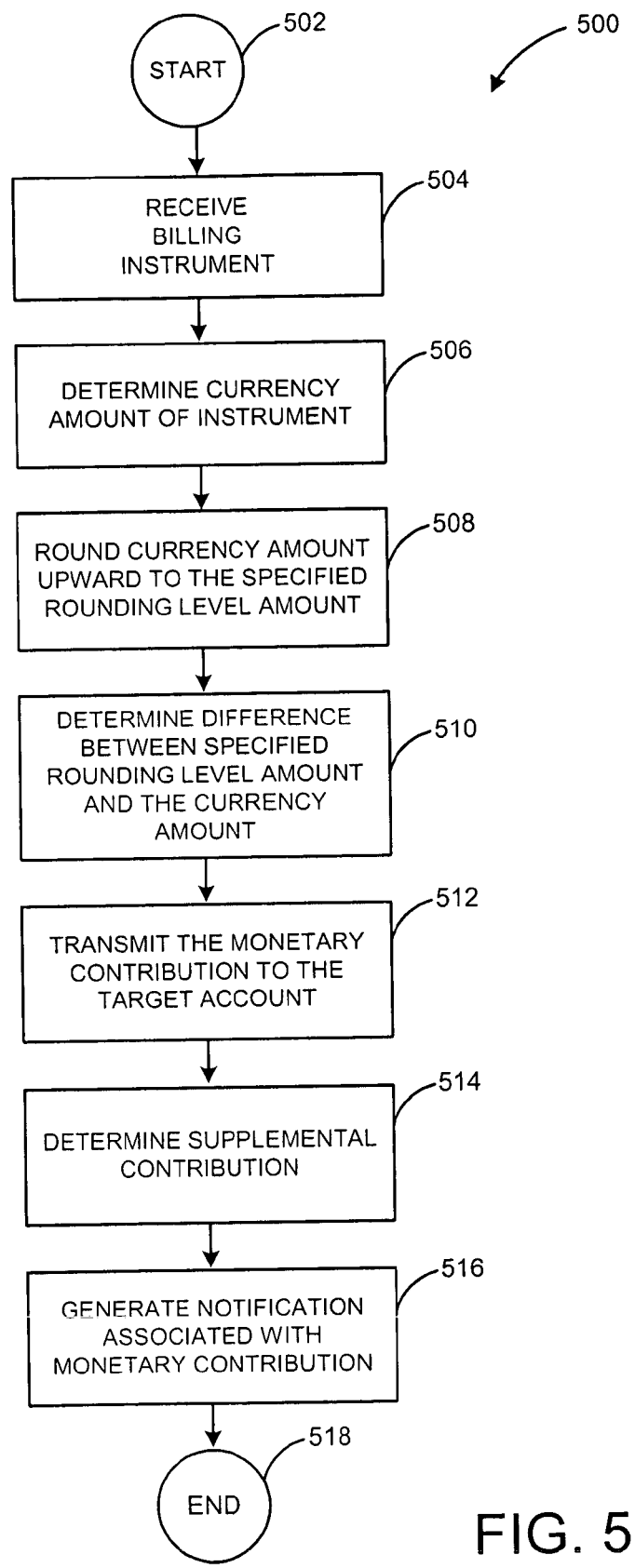
FIG. 5 illustrates a flow diagram of another method in accordance with one embodiment of the invention associated with a billing instrument.

FIG. 5 illustrates an example of another method 500 in accordance with the invention. The method 500 determines a monetary contribution from a billing instrument associated with a donor. The method 500 begins at block 502.

Block 502 is followed by block 504, in which a billing instrument is received. The collection-processing engine 118 at the server 104 or the collection-processing engine 134 at the account institution 128 receives the billing instrument for processing by method 500. In either case, the collection-processing engine 118, 134 obtains billing information associated with the billing instrument. In some instances, the billing instrument includes electronic data that have been transmitted to the collection-processing engine by a third-party. In other instances, the billing instrument includes data that have been keyed or otherwise input to the collection-processing engine by a third-party. Information collected by the collection-processing engine can include, but is not limited to, address information, donor information, routing data, employer information, employee identification data, tax identification data, matching-contributor information, bank identification data, account identification data, payor data, payee data, currency amount of the billing instrument, date of the billing instrument, and guarantor of the billing instrument.

In some embodiments, the collection-processing engine 118, 134 can determine whether authorization to determine a monetary contribution exists from a donor or an entity associated with a donor. If authorization is determined to exist, the method 500 would then proceed. If, however, no instructions existed, then the method 500 would end. An authorization can be in the form of previously stored instructions in memory 116, 132, database 120, or another data storage device accessible by the collection-processing engine 118, 134 to determine whether authorization exists. For example, authorization can include, but is not limited to, instructions for a particular instrument, instructions for a particular period of time, instructions for a particular transaction involving an instrument, or real time instructions received from a donor or entity associated with a donor.

Block 504 is followed by block 506, in which a currency amount of the billing instrument is determined. For example, a billing instrument such as a utility bill in the amount of $23.45 can be received by the collection-processing engine 118 at the server 104. The collection-processing engine 118 can determine that the currency amount of the utility bill is "$23.45."

Block 506 is followed by block 508, in which the collection-processing engine 118, 134 receives the currency amount determined previously at block 506 and rounds the currency amount upward to a specified rounding level amount. From the example above, a utility bill is determined to have a currency amount of $23.45. The collection-processing engine rounds the currency amount to the specified rounding level, in this case, the next higher whole currency amount of $24.00. Selection of the specified rounding level such as the next higher whole currency amount provides the donor with a bill from the utility bill in a rounded whole dollar amount, $24.00, thus making an accounting of the remaining currency amount of the utility bill easier to process by a donor. The next higher whole currency amount is represented by an integer portion "24" without a decimal portion. That is, the decimal portion is null or zero. In other embodiments of the method, the currency amount could be rounded upward by a specified rounding level including, but not limited to, a specified rounding amount or level, a predetermined multiple, fixed amount, or percentage of the currency amount.

Block 508 is followed by block 510, in which a difference between the specified rounding level amount and the currency amount of the billing instrument is determined. The collection-processing engine 118, 134 performs a mathematical calculation on the currency amount determined previously at block 506 and the specified rounding level amount, in this case the next higher whole currency amount determined previously at block 508. The difference (a positive value) between the amounts from blocks 508 and 506 is an amount of currency from the instrument that will be a monetary contribution from the donor to another entity. By way of example, the following mathematical algorithm provides a desired result for a billing instrument:

Difference=Next Rounded Currency Amount—Currency Amount of Instrument

From the example above, the utility bill currency amount determined at block 506 is $23.45, and the next higher whole currency amount determined at block 508 is $24.00. Implementing the mathematical algorithm above provides a difference between the amounts from blocks 508 and 506 of $0.55. Therefore, the amount to be debited from the donor account and contributed to the target account is $0.55.

Block 510 is followed by block 512, in which the monetary contribution is transmitted to a target account. The collection-processing engine 118, 134 determines the amount of the monetary contribution, and then credits a target account with the amount of the monetary contribution. The target account receives the amount of the monetary contribution such that an entity associated with the target account can access the monetary contribution.

Likewise, in the example provided, the next higher whole currency amount of the billing instrument from block 508 is debited from a donor account. The donor account is debited by the rounded up currency amount in order to satisfy the billing instrument, such that a donor associated with the donor account can access some or all of the remaining funds in the donor account. In debiting the donor account by the rounded currency amount from the billing instrument, the collection-processing engine 118, 134 pays the billing instrument from monetary funds in the donor account. In most instances, payment of the rounded currency amount from the billing instrument from the donor account secures the amount of the monetary contribution prior to transferring the monetary contribution to the target account.

Block 512 is followed by block 514, in which a supplemental contribution is determined. In some instances, the collection-processing engine 118, 134 receives instructions to supplement a monetary contribution. The instructions can be received prior to, during, or after transmitting the monetary contribution to the target account. The collection-processing engine 118, 134 implements the instructions, and depending upon the instructions, determines a currency amount for a supplemental contribution. If a supplemental contribution is determined, the supplemental contribution can then be transmitted to the target account.

For example, an instruction to a collection-processing engine 118, 134 can be to match the monetary contribution from a particular donor by contributing a matching currency amount from a third-party to the target account. In this example, if the currency amount of the monetary contribution were $0.55, and the donor is associated with a utility company, the instruction could be to contribute a matching contribution of $0.55 from a third-party account associated with the donor's utility company to the target account. Other instructions including various multiples, increments, or percentages of a currency amount for a supplemental contribution can be facilitated with the method 500 in accordance with other embodiments of the invention.

Block 514 is followed by block 516, in which a notification associated with the monetary contribution is generated. The collection-processing engine 118, 134 transmits a notification regarding the monetary contribution via the network 106 to an entity associated with the monetary contribution. The notification can be sent to a donor associated with a donor account, an entity associated with a target account, and/or a third-party associated with a third-party account. The notification can be a wireless message, an electronic mail message, a facsimile message, a messaging service message, or another type of message or mail that is transmitted via a network.

Notification can also be generated in a hard copy or paper format and transmitted via regular mail, facsimile, or another method or device. The notification can include, but is not limited to, a statement of the currency amount of the monetary contribution, a periodic statement of monetary contributions made by a particular donor over a period of time, or a statement of collected monetary and/or supplemental contributions made to an account.

Block 516 is followed by block 518, in which the method 500 ends.

Note that the method 500 can be repeated in an iterative fashion to automatically collect and determine a monetary contribution for a predefined period of time. In these instances, a collection-processing engine 118, 134 receives instructions to collect and to determine a monetary contribution for each instrument received for a predefined period of time or activity. The collection-processing engine 118, 134 processes each instrument received for the predefined period of time or activity, and determines the monetary contributions for collection to the target account as described above. A predefined period of time can include, but is not limited to, a day, a week, a pay period, a month, or a year. A predefined activity can include, but is not limited to, every purchase, every other purchase, every deposit into an account, or every other deposit into an account.

While the above description contains many specifics, these specifics should not be construed as limitations on the scope of the invention, but merely as exemplifications of the disclosed embodiments. Those skilled in the art will envision many other possible variations that are within the scope of the invention.

The invention I claim is:

1. A method for determining a monetary contribution to a recipient from an instrument associated with a donor, comprising:
   (a) receiving an instrument associated with a donor,
   (b) determining a currency amount of the instrument,
   (c) determining a monetary contribution associated with the donor, comprising:
      (i) determining whether the instrument is a billing instrument or financial instrument;
      (ii) if the instrument is a financial credit instrument, rounding the currency amount of the financial credit instrument downward to a lower currency amount; and determining the difference between the currency amount of the financial credit instrument and the lower currency amount, wherein the difference is the monetary contribution associated with the donor; and
      (iii) if the instrument is a billing instrument, rounding the currency amount of the billing instrument upward to a higher currency amount; and determining the difference between the higher currency amount and the currency amount of the billing instrument, wherein the difference is the monetary contribution associated with the donor; and
   (d) collecting the monetary contribution into a target account associated with a third-party recipient.

2. The method of claim 1, wherein determining a monetary contribution further comprises determining whether authorization exists for determining a monetary contribution from the instrument; and if authorization exists, proceeding with determining a monetary contribution.

3. The method of claim 1, wherein the lower currency amount is the next lower whole currency amount, and the higher currency amount is the next higher whole currency amount.

4. The method of claim 3, wherein the next lower whole currency amount comprises an integer with a null decimal portion, and the next higher whole currency amount comprises an integer with a null decimal portion.

5. The method of claim 1, wherein the lower currency amount is a specified rounding level, and the higher currency amount is a specified rounding level.

6. The method of claim 1, wherein the financial credit instrument is selected from a group comprising at least one of the following: a paycheck, a payroll deposit, a payroll contribution, an interest payment, a stock dividend, a bank dividend, shares of stock, an instrument with a monetary value, a check, a monetary deposit, an incentive-program deposit, an ATM card deposit, an electronic monetary transaction, or a smart card deposit.

7. The method of claim 1, wherein the billing instrument is selected from a group comprising at least one of the following: a bill, a utility bill, a services bill, a goods bill, a statement of account, a credit card bill, or a bill for a currency amount charged to the donor.

8. The method of claim 1, wherein the billing instrument is selected from a group comprising at least one of the following: at least one point-of-sale purchase, at least one credit card purchase, at least one debit card purchase, at least one check card purchase, at least one ATM card purchase, at least one electronic monetary transaction, or at least one smart card purchase.

9. The method of claim 1, wherein the monetary contribution is selected from a group comprising at least one of the following: a contribution to a third-party, a charitable contribution, a political contribution, a religious contribution, or a fundraising contribution.

10. The method of claim 1, further comprising:
    supplementing the monetary contribution with an additional currency amount.

11. The method of claim 10, wherein the additional currency amount is selected from a group comprising at least one of the following: a matching amount equal to the difference between the currency amount of the financial credit instrument and the lower currency amount; a matching amount equal to the difference between the higher currency amount and the currency amount of the billing instrument; a currency amount selected by a third-party; or a multiple of the monetary contribution.

12. The method of claim 11, wherein the notification is selected from a group comprising at least one of the following: a message sent to a donor associated with a donor account, a message sent to an entity associated with a target account, or a message sent to a third-party associated with a third-party account.

13. The method of claim 1, further comprising:
    providing a notification associated with the monetary contribution.

14. The method of claim 1, further comprising:
    receiving instructions to automatically collect a monetary contribution for a predefined period of time.

15. A method for collecting a monetary contribution from a donor associated with a financial credit instrument, comprising:
    receiving a financial credit instrument associated with a donor;
    determining a currency amount of the financial credit instrument;
    rounding the currency amount of the financial credit instrument downward to a specified rounding level amount;
    determining the difference between the currency amount of the financial credit instrument and the specified rounding level amount, wherein the difference is a monetary contribution associated with the donor; and
    transmitting the monetary contribution to a target account associated with a third-party recipient.

16. A method for collecting a monetary contribution from a donor associated with a billing instrument, comprising:
    receiving a billing instrument associated with a donor;
    determining a currency amount of the billing instrument;
    rounding the currency amount of the billing instrument upward to a specified rounding level amount;
    determining the difference between the specified rounding level amount and the currency amount of the billing instrument, wherein the difference is a monetary contribution associated with the donor; and
    transmitting the monetary contribution to a target account associated with a third-party recipient.

17. A system for automatically collecting a monetary contribution from a donor associated with an instrument, comprising:
    a collection-processing engine adapted to:
      (a) receive an instrument associated with a donor,
      (b) determine a currency amount of the instrument;

(c) determine a monetary contribution associated with the donor, further comprising:
  (i) determining whether the instrument is a billing instrument or financial credit instrument;
  (ii) if the instrument is a financial credit instrument, rounding the currency amount of the financial credit instrument downward to a lower currency amount; and determining the difference between the currency amount of the financial credit instrument and the lower currency amount, wherein the difference is the monetary contribution associated with the donor; and
  (iii) if the instrument is a billing instrument, rounding the currency amount of the billing instrument upward to a higher currency amount; and determining the difference between the higher currency amount and the currency amount of the billing instrument, wherein the difference is the monetary contribution associated with the donor; and
(d) collect the monetary contribution into a target account associated with a third-party recipient.

18. The system of claim 17, wherein the collection-processing engine is further adapted to determine whether authorization exists for determining a monetary contribution from the instrument; and if authorization exists, proceeding with the step to determine a monetary contribution.

19. The system of claim 18, wherein the next lower whole currency amount comprises an integer with a null decimal portion, and the next higher whole currency amount comprises an integer with a null decimal portion.

20. The system of claim 17, wherein the lower currency amount is the next lower whole currency amount, and the higher currency amount is the next higher whole currency amount.

21. The system of claim 17, wherein the lower currency amount is a specified rounding level, and the higher currency amount is a specified rounding level.

22. The system of claim 17, wherein:
the collection-processing engine is further adapted to:
  supplement the monetary contribution with an additional currency amount.

23. The system of claim 17, wherein:
the collection-processing engine is further adapted to:
  provide a notification associated with the monetary contribution.

24. The system of claim 23, wherein the notification is selected from a group comprising at least one of the following: a message sent to a donor associated with a donor account, a message sent to an entity associated with a target account, or a message sent to a third-party associated with a third-party account.

25. The system of claim 17, wherein the financial credit instrument is selected from a group comprising at least one of the following: a paycheck, a payroll deposit, a payroll contribution, an interest payment, a stock dividend, a bank dividend, shares of stock, an instrument with a monetary value, a check, a monetary deposit, a cash contribution, a can incentive-program deposit, an ATM card deposit, an electronic monetary transaction, or a smart card deposit.

26. The system of claim 17, wherein the billing instrument is selected from a group comprising at least one of the following: a bill, a utility bill, a services bill, a goods bill, a statement of account, a credit card bill, a bill for a currency amount charged to the donor, a point-of-sale purchase statement, a credit card purchase statement, a debit card purchase statement a check card purchase statement, an ATM card purchase statement, an electronic monetary transaction, or a smart card purchase statement.

27. The system of claim 17, wherein the monetary contribution is selected from a group comprising at least one of the following: a charitable contribution, a political contribution, a religious contribution, or a fundraising contribution.

28. The system of claim 17, wherein the collection-processing engine is further adapted to:
receive instructions to automatically collect a monetary contribution for a predefined period of time.

29. A system for collecting a monetary contribution from a donor associated with a financial instrument, comprising:
a collection-processing engine adapted to:
  receive a financial credit instrument associated with a donor;
  determine a currency amount of the financial credit instrument;
  round the currency amount of the financial credit instrument downward to the next whole currency amount;
  determine the difference between the currency amount of the financial credit instrument and the next whole currency amount, wherein the difference is a monetary contribution associated with the donor; and
  transmit the monetary contribution to a target account associated with a third-party recipient.

30. The system of claim 29, wherein the collection-processing engine is further adapted to determine whether authorization exists for determining a monetary contribution from the instrument; and if authorization exists, proceeding with processing of the instrument.

31. The system of claim 29, wherein the next whole currency amount comprises an integer with a null decimal portion.

32. The system of claim 29, wherein the collection-processing engine is farther adapted to:
supplement the monetary contribution with an additional currency amount.

33. The system of claim 29, wherein the additional currency amount is selected from a group comprising at least one of the following: a matching amount equal to the difference between the currency amount of the financial credit instrument and the next whole currency amount is deposited in the contribution account; a currency amount selected by a third-party; or a multiple of the monetary contribution.

34. The system of claim 29, wherein the deposit processing engine is further adapted to:
provide a notification associated with the monetary contribution.

35. The system of claim 34, wherein the notification is selected from a group comprising at least one of the following: a message sent to a donor associated with a donor account, a message sent to an entity associated with a target account, or a message sent to a third-party associated with a third-party account.

36. The system of claim 29, wherein the financial credit instrument is selected from a group comprising at least one of the following: a paycheck, a payroll deposit, a payroll contribution, an interest payment, a stock dividend, a bank dividend, shares of stock, an instrument with a monetary value, a check, a monetary deposit, an incentive-program deposit, an ATM card deposit, an electronic monetary transaction, or a smart card deposit.

37. The system of claim 29, wherein the monetary contribution is selected from a group comprising at least one of the following: a charitable contribution, a political contribution, a religious contribution, or a fundraising contribution.

38. The system of claim 29, wherein the collection-processing engine is further adapted to:
receive instructions to automatically collect a monetary contribution for a predefined period of time.

39. A system for collecting a monetary contribution from a donor associated with a billing instrument comprising:
a collection-processing engine adapted to:
receive a billing instrument associated with a donor;
determine a currency amount of the billing instrument;
round the currency amount of the billing instrument upward to the next whole currency amount;
determine the difference between the next whole currency amount and the currency amount of the billing instrument, wherein the difference is a monetary contribution associated with the donor; and
transmit the monetary contribution to a target account associated with a third-party recipient.

40. The system of claim 39, wherein the collection-processing engine is further adapted to determine whether authorization exists for determining a monetary contribution from the instrument; and if authorization exists, proceeding with processing of the instrument.

41. The system of claim 39, wherein the next whole currency amount comprises an integer with a null decimal portion.

42. The system of claim 39, wherein the collection-processing engine is further adapted to:
supplement the monetary contribution with an additional currency amount.

43. The system of claim 39, wherein the additional currency amount is selected from a group comprising at least one of the following: a matching amount equal to the difference between the next whole currency amount and the currency amount of the billing instrument is deposited in the contribution account; a currency amount selected by a third-party; or a multiple of the monetary contribution.

44. The system of claim 39, wherein the deposit processing engine is further adapted to:
provide a notification associated with the monetary contribution.

45. The system of claim 44, wherein the notification is selected from a group comprising at least one of the following: a message sent to a donor associated with a donor account, a message sent to an entity associated with a target account, or a message sent to a third-party associated with a third-party account.

46. The system of claim 39, wherein the billing instrument is selected from a group comprising at least one of the following: a bill, a utility bill, a services bill, a goods bill, a statement of account, a credit card bill, a bill for a currency amount charged to the donor, a point-of-sale purchase statement, a credit card purchase statement, a debit card purchase statement, a check card purchase statement, an ATM card purchase statement, an electronic monetary transaction, or a smart card purchase statement.

47. The system of claim 39, wherein the monetary contribution is selected from a group comprising at least one of the following: a charitable contribution, a political contribution, a religious contribution, or a fundraising contribution.

48. The system of claim 39, wherein the collection-processing engine is further adapted to:
receive instructions to automatically collect a monetary contribution for a predetermined period of time.

* * * * *